(12) United States Patent
Van Hooser et al.

(10) Patent No.: US 9,505,376 B2
(45) Date of Patent: Nov. 29, 2016

(54) ACTUATOR HOUSING SEALING MECHANISM

(71) Applicant: TK Holdings Inc., Auburn Hills, MI (US)

(72) Inventors: Joshua D. Van Hooser, Waterford, MI (US); Larry M. Wilmot, Oxford, MI (US); Ingo Kalliske, Potsdam (DE); Kazuhiro Abe, Echigawa (JP); Georg Rasch, Ulm (DE)

(73) Assignee: TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 14/791,988

(22) Filed: Jul. 6, 2015

(65) Prior Publication Data

US 2016/0001736 A1 Jan. 7, 2016

Related U.S. Application Data

(60) Provisional application No. 62/020,973, filed on Jul. 3, 2014.

(51) Int. Cl.
*F15B 15/19* (2006.01)
*B60R 21/38* (2011.01)

(52) U.S. Cl.
CPC .............. *B60R 21/38* (2013.01); *F15B 15/19* (2013.01)

(58) Field of Classification Search
CPC .......... F42D 1/043; F42D 1/045; F42D 1/04; F15B 15/19; B60R 21/38
USPC ......................................... 102/275.6, 275.11
See application file for complete search history.

(56) References Cited

U.S. PATENT DOCUMENTS

| | | | |
|---|---|---|---|
| 2,488,547 A * | 11/1949 | Liljegren | F42B 23/14 102/429 |
| 3,098,439 A * | 7/1963 | Berger | C07C 29/62 102/275 |
| 3,199,288 A | 8/1965 | Nahas | |
| 4,281,601 A * | 8/1981 | Overman | F42C 19/02 102/276 |
| 5,529,155 A | 6/1996 | Jones et al. | |
| 7,195,090 B2 | 3/2007 | Parks et al. | |
| 7,559,399 B2 | 7/2009 | Lewis et al. | |
| 2009/0223360 A1 | 9/2009 | Aoki et al. | |
| 2012/0080856 A1 | 4/2012 | Smith | |
| 2012/0125219 A1 | 5/2012 | Mayville et al. | |

FOREIGN PATENT DOCUMENTS

FR        2650585        *   2/1991

* cited by examiner

*Primary Examiner* — Stephen M Johnson
(74) *Attorney, Agent, or Firm* — Meunier Carlin & Curfman LLC

(57) ABSTRACT

A pressurized fluid-powered actuator includes a housing and a striker movably coupled to the housing. Resilient sealing means are positioned between the striker and the housing. The sealing means are compressible so as to seal an end of the housing responsive to a force exerted on the sealing means by the striker in a first direction toward the housing. Releasable retaining means are operatively coupled to the striker and are structured to prevent motion of the striker in a second direction opposite the first direction prior to activation of the actuator, and responsive to a reaction force in the second direction exerted on the striker by the sealing means when the sealing means is compressed.

20 Claims, 6 Drawing Sheets

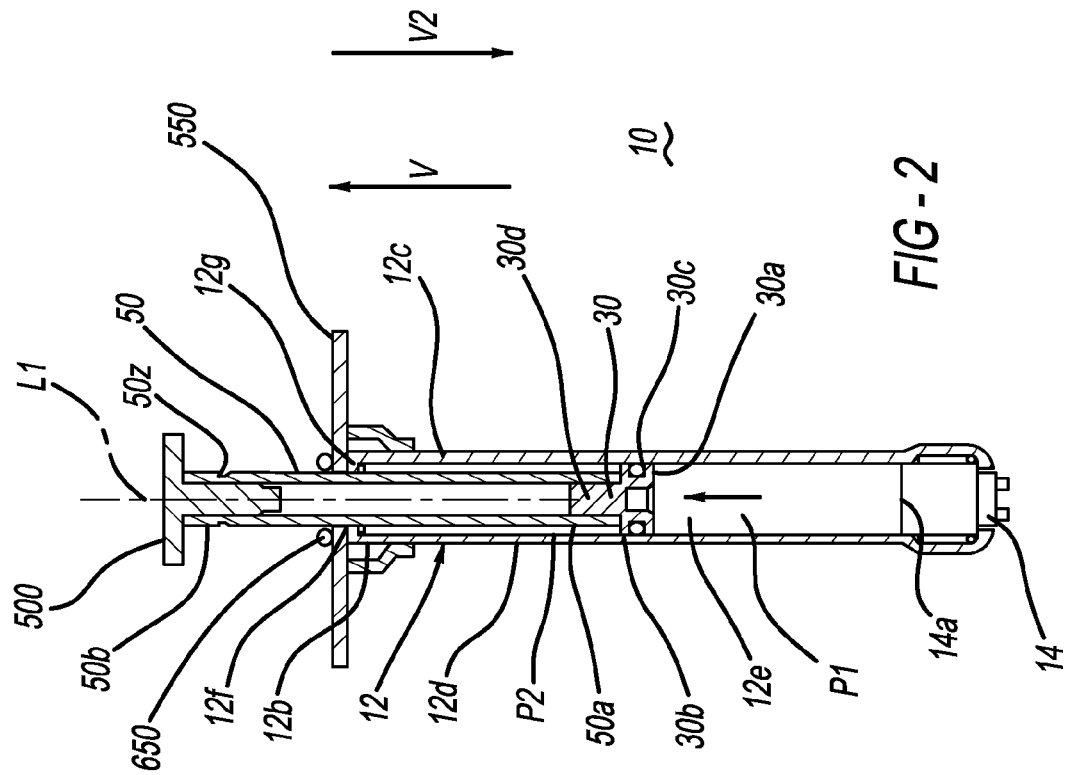

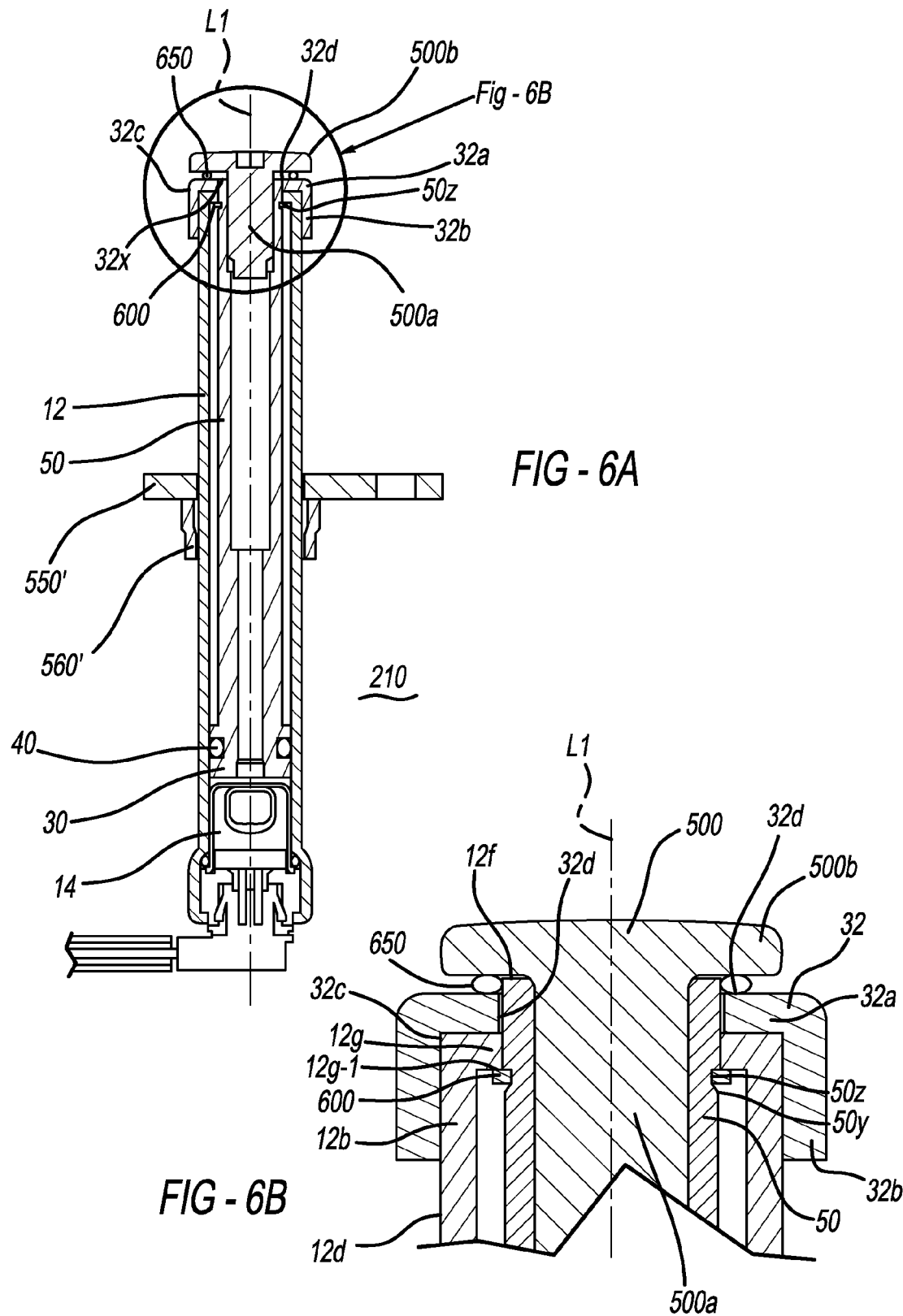

ACTUATOR HOUSING SEALING MECHANISM

CROSS-REFERENCE TO RELATED APPLICATIONS

This application claims the benefit of U.S. Provisional Application Ser. Nos. 62/020,973, filed on Jul. 3, 2014, the disclosure of which is incorporated herein by reference in its entirety.

BACKGROUND OF THE INVENTION

The embodiments described herein generally relate to pressurized fluid-powered actuators and, more particularly, to methods and/or mechanisms for environmentally sealing an actuator prior to actuator activation.

In pressurized fluid-powered, piston driven actuators, fluid from a pressurized fluid source (for example, a pyrotechnic gas generator) is applied to a piston, thereby producing movement of the piston within the housing, and deployment or extension of an attached piston rod from the actuator housing. In this manner, force may be exerted by the piston rod on an actuatable element located exterior of the actuator housing.

In certain actuator designs and applications, it is desirable to seal the actuator housing to prevent entry therein of contaminants and foreign objects prior to activation of the actuator. Such contaminants and foreign objects might prevent or interfere with proper operation of the actuator. Known techniques for sealing the actuator are structurally disadvantageous in certain applications and may also incur an undesirable or unacceptable level of additional cost, due to the addition of numerous seal-related components, for example.

Thus, an ongoing need exists for improved methods and/or mechanisms for sealing an actuator housing prior to activation of the actuator.

SUMMARY OF THE INVENTION

In one aspect of the embodiments described herein, a pressurized fluid-powered actuator is provided. The actuator includes a housing and a striker movably coupled to the housing. Resilient sealing means are positioned between the striker and the housing. The sealing means are compressible so as to seal an end of the housing responsive to a force exerted on the sealing means by the striker in a first direction toward the housing. Releasable retaining means are operatively coupled to the striker and are structured to prevent motion of the striker in a second direction opposite the first direction prior to activation of the actuator, and responsive to a reaction force in the second direction exerted on the striker by the sealing means when the sealing means is compressed.

In another aspect of the embodiments of the described herein, an actuator is provided. The actuator includes an actuator housing having an opening enabling fluid communication between an exterior and an interior of the housing. A striker is movably coupled to the housing and includes a bearing portion positioned exterior of the housing. A bearing surface is positioned opposite the striker bearing portion. The bearing surface defines an opening permitting fluid communication with the housing interior. Sealing means are also provided and are structured to abut the bearing surface so as to circumscribe the bearing surface opening. The sealing means are also structured to be compressible between the striker bearing portion and the bearing surface so as to form a seal between the striker and the bearing surface. Releasable retaining means are operatively coupled to the striker. The retaining means are configured to prevent motion of the striker in a direction away from the housing when the sealing means is compressed, prior to activation of the actuator.

In another aspect of the embodiments of the described herein, an actuator is provided. The actuator includes an actuator housing having an opening enabling fluid communication between an exterior and an interior of the housing. A piston rod is movably positioned within the housing. A striker is operatively coupled to the piston rod so as to move with the piston rod. The striker includes a bearing portion positioned exterior of the housing. A bearing surface is positioned opposite the striker bearing portion. The bearing surface defines an opening permitting fluid communication with the housing interior. Sealing means are provided and are structured to abut the bearing surface so as to circumscribe the bearing surface opening. The sealing means are also structured to be compressible between the striker bearing portion and the bearing surface so as to form a seal between the striker and the bearing surface. Releasable retaining means are operatively coupled to the piston rod. The retaining means are structured to prevent motion of the piston rod in a direction from the housing interior toward the housing exterior when the sealing means is compressed, prior to activation of the actuator.

BRIEF DESCRIPTION OF THE DRAWINGS

FIG. 1 shows a cross-sectional side view of an embodiment of an actuator powered by pressurized fluid (such as a pressurized gas). The actuator is shown in a condition after assembly of the actuator, but prior to activation of the actuator, with one embodiment of a housing sealing means shown in a compressed state.

FIG. 2 shows a cross-sectional side view of the actuator of FIG. 1 at a point in time after activation.

FIG. 6A is a cross-sectional view showing another alternative embodiment of the actuator after a striker is fully assembled to a piston rod of the actuator and the housing seal is compressed.

FIG. 6B is a magnified view of a portion of the actuator shown in FIG. 6A.

DETAILED DESCRIPTION

Figure 3:
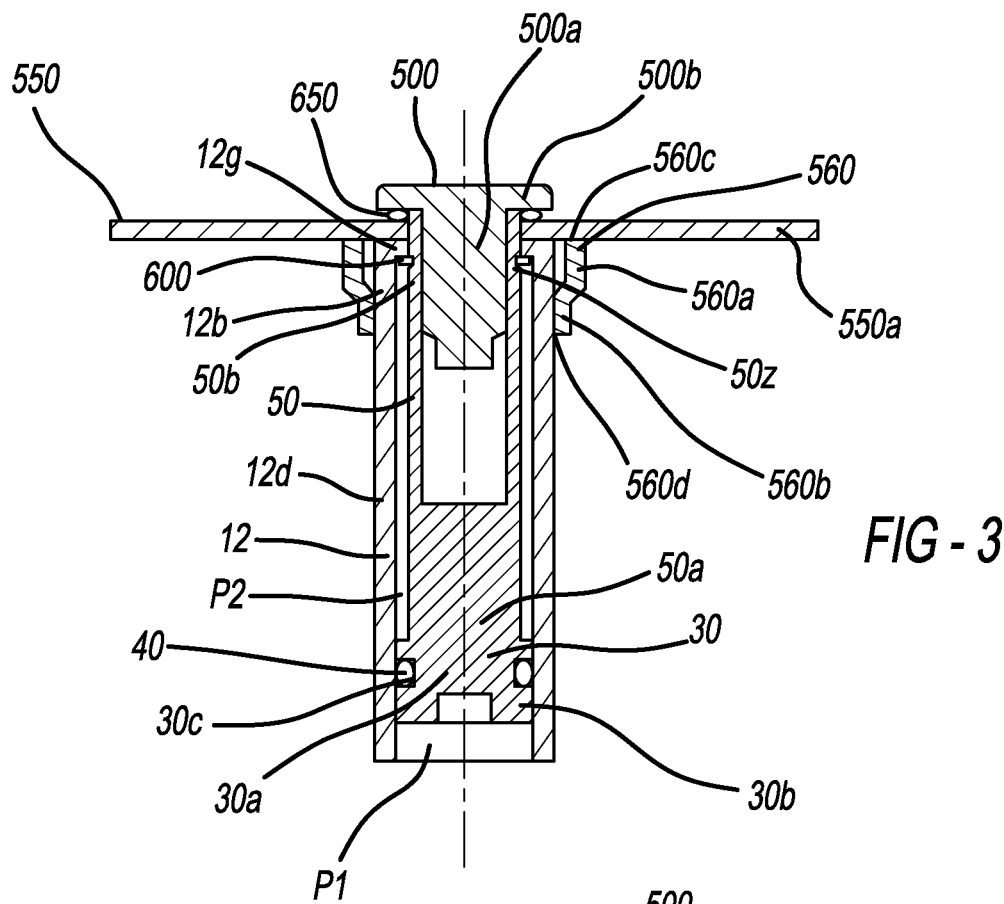
FIG. 3 is a magnified cross-sectional view showing the actuator embodiment of FIGS. 1 and 2 prior to compression of a housing sealing means.

Like reference numerals refer to like parts throughout the description of several views of the drawings.

FIGS. 1-2 show cross-sectional side views of a pressurized gas-powered actuator in a condition just prior to activation (FIG. 1) and after activation (FIG. 2). The actuator 10 may be mounted to any suitable device or mechanism, and may be operatively coupled (via piston rod 50, described in greater detail below) to the device or mechanism for transmitting a force to the device or mechanism upon activation. The actuation force is generated responsive to the introduction of a pressurized fluid (for example, a pressurized gas) into a housing of the actuator, in a manner described below. The pressurized gas may be generated within the housing (for example, by a gas generator incorporated into the housing), or the gas may be introduced into the housing from an external gas source in fluid communication with the housing interior. One possible application for an actuator as described herein is in lifting a portion of a hood of an automotive vehicle.

In the embodiment shown herein, actuator 10 has a housing 12, a piston 30 slidably positioned within the housing, and a piston rod 50 attached to the piston so as to move in conjunction with the piston. Housing 12 has an outermost housing wall 12*d* defining a first end 12*a*, a second end 12*b*, a longitudinal central axis L1 of the housing 12, and a body 12*c* connecting the first and second ends. Wall 12*d* also defines a hollow interior 12*e* of the housing. In the embodiment shown in FIGS. 1-2, housing first end 12*a* is flared radially outwardly to accommodate a suitable gas generator 14 (for example, a known micro-gas generator) to be inserted and retained therein by crimping, adhesive attachment, or any other suitable method. Alternatively, the gas generator 14 may be attached to an exterior of the housing first end using a suitable retention method. A gas-emitting portion 14*a* of the gas generator 14 is positioned within the housing so that generated gases flow into the housing interior after activation of the gas generator. If desired, a suitable seal (such as an epoxy seal, o-ring seal or other sealing means)(not shown) may be provided to prevent or minimize leakage of generated gas between the gas generator 14 and the housing 12 to an exterior of the housing.

In the embodiment shown in FIGS. 1-2, second end 12*b* has an opening 12*f* structured to receive therethrough a portion of piston rod 50 attached to piston 30, which is slidably positioned in the housing interior. Opening 12*f* may be sized or otherwise structured to laterally constrain or support the piston rod 50 as portions of the rod move into and out of the housing through opening 12*f*. In the particular embodiment shown in FIGS. 1-2, an end wall 12*g* is formed from a portion of housing 12, and opening 12*f* is drilled or otherwise formed in the wall 12*g*.

Figure 4:
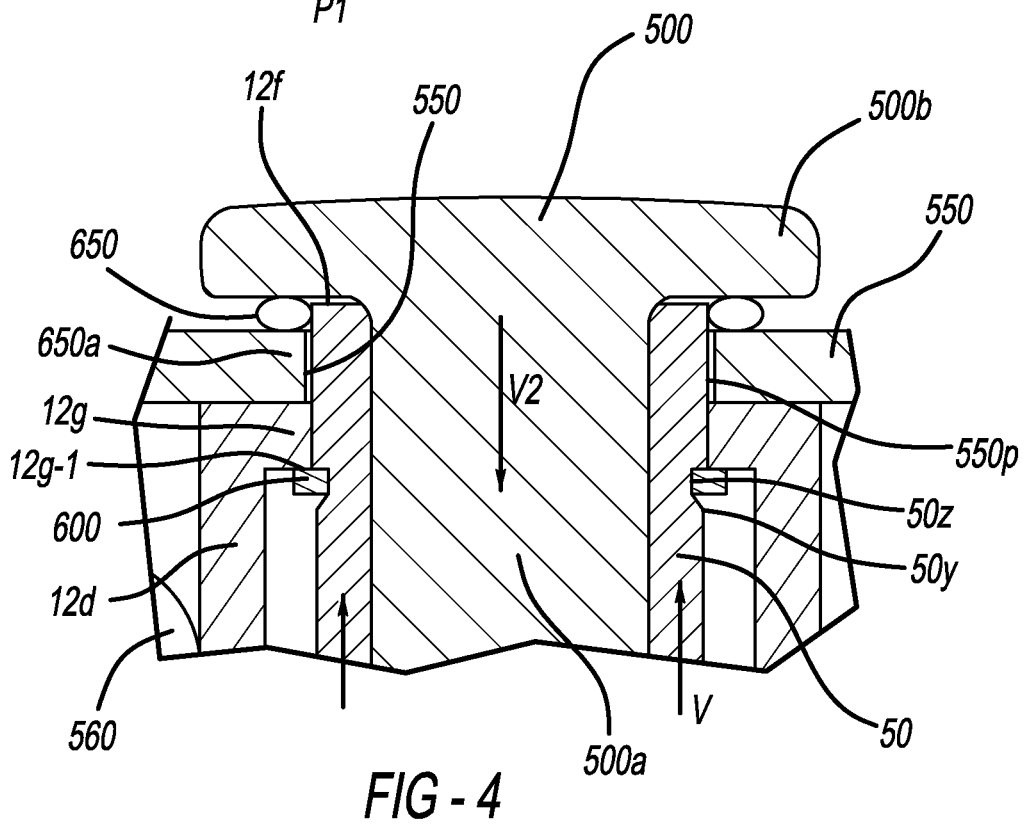
FIG. 4 is a magnified cross-sectional view of the actuator embodiment of FIGS. 1 and 2 showing the forces acting on elements of one embodiment of the actuator during compression of the housing sealing means.
Figure 5:
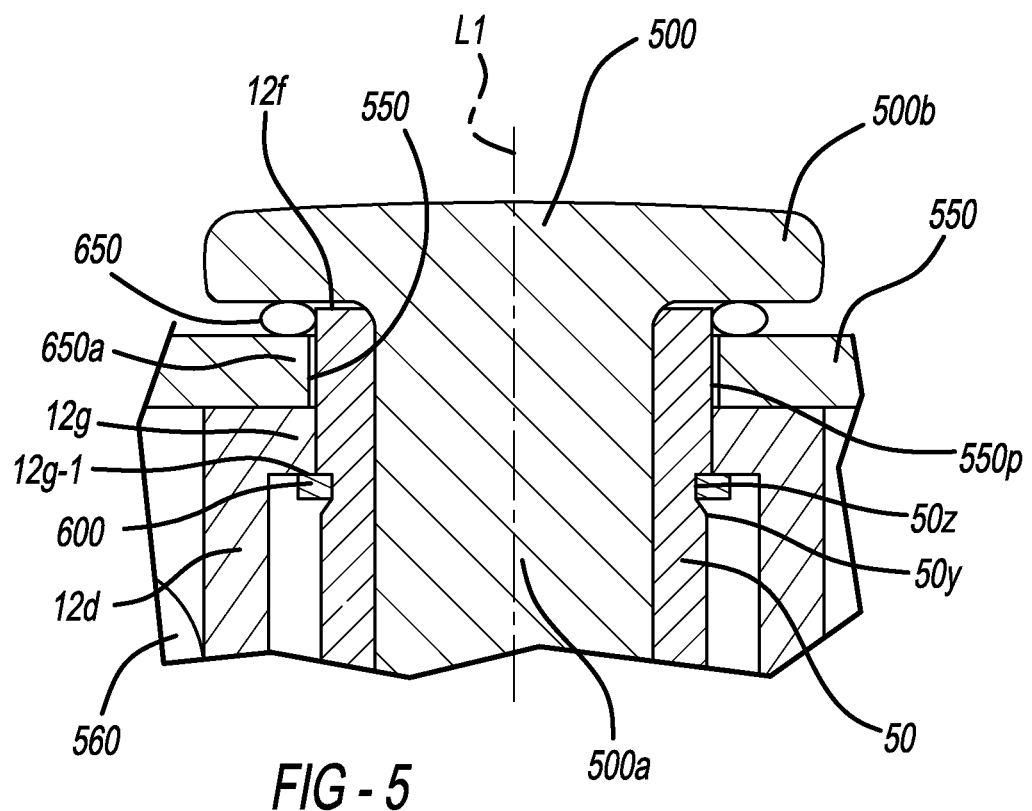
FIG. 5 is a magnified cross-sectional view showing an embodiment of the actuator embodiment of FIG. 4 after a striker is fully assembled to a piston rod of the actuator and the housing seal is compressed.

A bearing surface is provided to enable compression of the sealing means 650 (described below) thereagainst. The bearing surface defines an opening enabling fluid communication between an exterior and an interior of the housing. In the embodiment shown in FIGS. 4-5, the sealing means is provided by a mounting member 550 secured to housing 12 by welding or any other suitable means. Mounting member 550 may be used to attach the assembled actuator to a vehicle or other mechanism to which the actuator force is to be transmitted. In the embodiment shown in the drawings, mounting member 550 is in the form of a flat plate having bolt holes 550*a* formed therein. However, the mounting member may have any configuration suitable for the requirements of a particular application. Mounting member 550 may be attached to housing end 12*b* so as to form a gas-tight seal between the housing and the mounting member. When the mounting member 550 is attached to the housing 12 as shown in FIGS. 4-5, so as to form a gas-tight seal therebetween, opening 550*p* enables fluid communication therethrough between an exterior of the housing and the housing interior.

In the embodiment shown in FIGS. 1-5, mounting member 550 is secured to housing 12 using a collar 560. In the embodiment shown, collar 560 has a first, relatively larger diameter portion 560*a* and a second, relatively smaller diameter second portion 560*b* extending from the first portion 560*a*. Mounting member 550 abuts an end surface 560*c* of first portion 560*a* and is secured to the collar in this position using a weld or other suitable means. Second portion 560*b* forms a close fit or a slight interference fit with the outer surface of housing wall 12*d* and may be slid along the housing wall until the mounting member abuts housing end 12*b*. Then, the mounting member 550 may be secured in this position by welding or otherwise suitably securing the collar to the housing, along the interface between a collar end 560*d* and housing 12.

Figure 5A:
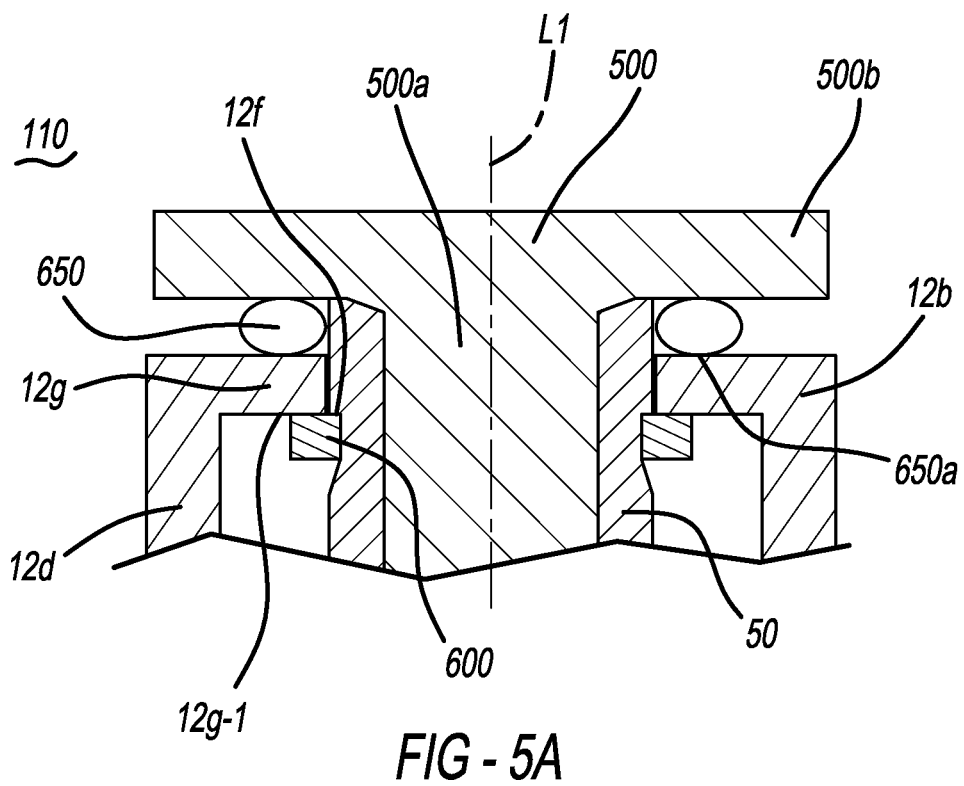
FIG. 5A is a magnified cross-sectional view showing an alternative embodiment of the actuator after a striker is fully assembled to a piston rod of the actuator and the housing seal is compressed.

Referring to FIG. 5A, in an alternative embodiment 110 of the actuator, the bearing surface for the sealing means is formed by housing end 12*b*, which is structured so as to enable the striker 500 to compress the sealing means 650 against housing end wall 12*g* as shown, thereby permitting the mounting member 550 to be omitted or repositioned to another portion of the housing exterior. In this embodiment, opening 12*f* enables fluid communication therethrough between an exterior of the housing and the housing interior.

Piston 30 is slidably positioned within housing interior 12*e*. Piston has a base 30*a* with an outer wall 30*b*. A groove 30*c* is formed in wall 30*b* and is structured for receiving therein an O-ring 40 or another suitable resilient gas-tight seal. In a known manner, O-ring 40 resiliently slidingly contacts the interior surfaces of housing wall 12*d*, thereby providing a substantially gas-tight seal between the piston 30 and wall 12*d*. When piston 30 is positioned in housing 12 with O-ring 40 contacting the housing wall interior surfaces, the region of contact between the O-ring and the housing wall defines a boundary between a higher pressure side P1 of the piston and a lower pressure side P2 of the piston.

In the embodiment shown in FIGS. 1-2, a projection 30*d* extends from base 30*a*. Projection 30*d* is structured for engaging (or for suitable attachment to) an associated piston rod 50 in an interference fit, or for otherwise enabling or facilitating attachment of the piston rod 50 to the piston 30.

Piston rod 50 is the mechanism through which the actuator force is transmitted to an element (for example, a portion of a hood of a vehicle (shown schematically as element 902 in FIG. 9)) connected to the piston rod. Piston rod 50 has a first end 50*a* attached to the piston so as to move in conjunction with the piston. A second end 50*b* opposite the first end may be configured for attachment to (or to bear against) any element or mechanism to which the actuator force is to be transmitted. In the embodiment shown in FIGS. 1-2, piston rod 50 is hollow. Alternatively, the piston rod may be solid. The piston rod may also have any particular length, diameter, shape and/or other characteristic (s) suitable or necessary for a particular application.

In addition, as seen in FIG. 3, as part of a releasable retaining means (described elsewhere herein), a groove or a shoulder 50*z* may be formed along an exterior surface of piston rod 50 proximate piston rod second end 50*b*. Groove 50*z* is sized for receiving therein a portion of a retaining clip 600, as described below.

FIGS. 3-5 are magnified cross-sectional views showing the second end 12*b* of housing 12 of FIGS. 1-2 at various stages during assembly of the actuator 10. FIG. 3 shows the actuator prior to compression of housing sealing means 650 (described below). FIG. 4 shows the forces acting on one embodiment of the actuator during compression of sealing means 650. FIG. 5 shows the actuator after the striker 500 (described below) is fully assembled to the piston rod 50, with the sealing means 650 in a compressed state.

In embodiments described herein, striker 500 is movably coupled to the housing by attachment to piston rod second end 50*b*. Striker 500 is structured to directly contact a surface of an object, to transmit the actuator force to the object after activation of the actuator. Striker 500 is also structured to exert pressure on sealing means 650 (described below) when the striker is attached or coupled to the piston rod, thereby forming a gas-tight housing seal as described herein. In the embodiment shown in the drawings, striker 500 has a base portion 500*a* and a bearing portion 500*b* extending outwardly from the base portion. Bearing portion 500*b* compresses seal 650 when the striker is assembled to the piston rod. Striker 500 may be formed from any suitable material, for example, a metallic material, a polymer or other material.

Striker 500 may be attached to piston rod 50 using any suitable method. In one embodiment, threads (not shown) are formed along an exterior surface of the striker base portion, and complementary, mating threads (not shown) are formed along the interior surfaces of the wall of the hollow piston rod. In another embodiment, the striker base portion 500*a* engages the piston rod walls in an interference fit as the base portion is inserted into the piston rod. Other methods may be used to secure the striker to the piston rod. During assembly of the striker to the piston rod, the striker applies pressure to the sealing means 650 to compress the seal 650 against the bearing surface (which is, in the embodiment shown in FIGS. 1-5, provided by mounting member 550), thereby forming a housing seal as described below. Any method used to secure the striker to the piston rod must also hold the striker in position with respect to the piston rod 50 so as to maintain compression of the sealing means 650 for the entire period after assembly of the actuator, during installation of the actuator (for example, in a vehicle in a hood lifter application) and prior to actuator activation.

Sealing means 650 is positioned between mounting member 550 and the striker 500. In one embodiment, sealing means 650 is structured and positioned so as to resiliently deform to provide a gas-tight seal between mounting member 550 and striker 500 when the seal is compressed between the mounting member and the striker. This seal aids in preventing environmental contamination through housing opening 12*f* prior to actuator activation. The terms "resiliently deformable" and "resiliently deform" are used herein to refer to an element of the actuator that deforms responsive to an applied force, and which returns to its undeformed state upon removal of the applied force. Such elements also exert a reaction force against the feature applying the force to the actuator.

Sealing means 650 is also structured to abut the bearing surface such that the area of contact between the sealing means and the bearing surface for the sealing means circumscribes the opening formed in the bearing surface. As used herein, the term "circumscribe" as applied to the positioning of the sealing means in relation to the opening 12*f* means "to enclose within bounds" (i.e., the portion of the sealing means abutting the bearing surface encloses or surrounds the bearing surface opening so that when the sealing means is compressed, a fluid-tight seal is formed between the striker and the bearing surface). For example, as seen in FIGS. 4-5, the annular contact region 650*a* between the sealing means 650 and the mounting member surrounds or encloses the opening 550*p* formed in the mounting member. Also, as seen in FIG. 5A, the annular contact region 650*a* between the sealing means 650 and the housing end wall 12*g* surrounds or encloses the opening 12*f* formed in the housing second end 12*b*.

Figure 7:
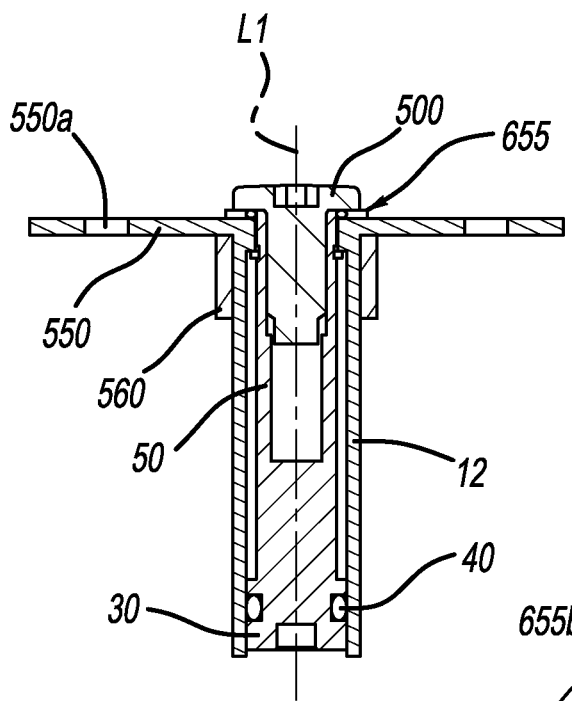
FIG. 7 is a cross-sectional side view similar to FIG. 1, showing another embodiment of a pressurized gas-powered actuator in a condition after assembly of the actuator, but prior to activation of the actuator, with another embodiment of a housing sealing means shown in a compressed state.
Figure 8A:
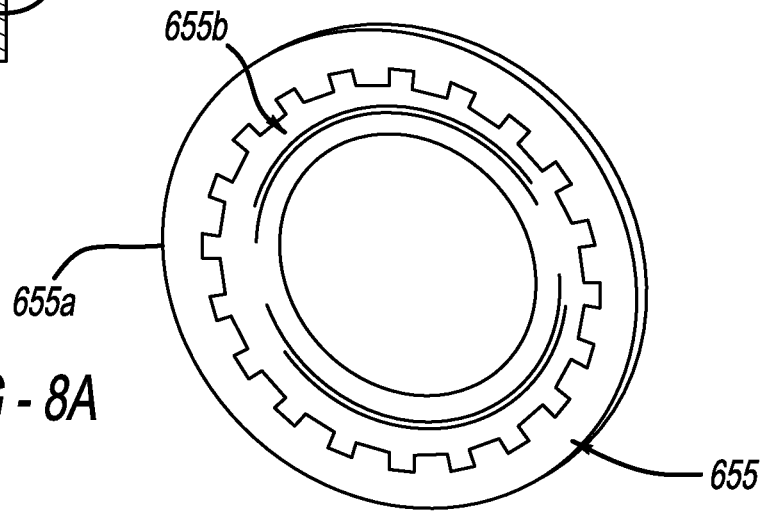
FIG. 8A is a perspective view of the housing sealing means embodiment shown in the actuator embodiment of FIG. 7.
Figure 8B:
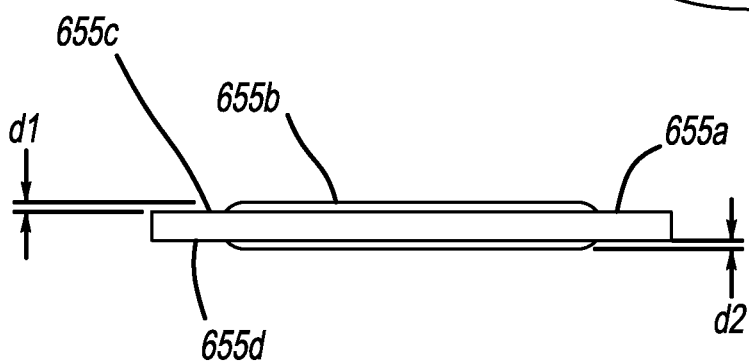
FIG. 8B is a side view of the sealing means embodiment shown in FIG. 8A.
Figure 8C:
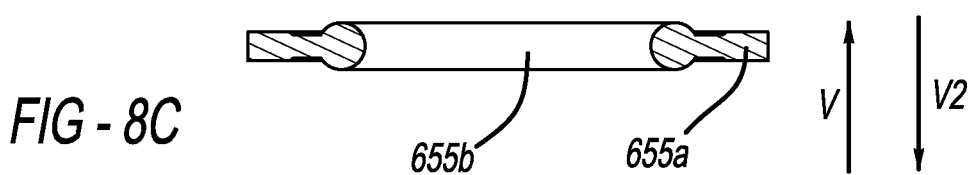
FIG. 8C is a cross-sectional side view of the sealing means embodiment shown in FIG. 8B.

In one particular embodiment, sealing means 650 is an O-ring or gasket formed from a rubber or any other suitable resiliently deformable material, which may be slid onto end 50*b* of the piston rod. Referring to FIGS. 7 and 8A-8C, in another particular embodiment 655, the sealing means is in the form of a ring or washer 655*a* overmolded with an elastomeric or other resiliently deformable material 655*b*, such as a rubber compound, for example. In the embodiment shown, the washer 655*a* has a pair of oppositely facing, parallel surfaces 655*c* and 655*d*. The overmolded elastomeric material 655*b* extends in opposite directions V and V2 past surfaces 655*c* and 655*d*, respectively, to a distance d1 from surface 655*c* and a distance d2 from surface 655*d*. Distances d1 and d2 may be equal or different. Referring to FIG. 7, when the striker is forced in direction V2 toward the bearing surface, the overmolded elastomeric material 655*b* on each side of the washer 655*a* is compressed in directions toward the washer.

Alternatively, a non-resilient sealing means may be compressed between the mounting member and striker to form the seal. Alternatively, any of a variety of other resilient or non-resilient sealing means may be used. The particular structural features of the bearing surface (for example, mounting member 550 or housing end 12*b*), piston rod 50, and striker 500 may be defined according to the type of sealing means to be employed.

The embodiments and mechanisms just described provide effective ways to environmentally seal the actuator housing interior prior to actuator activation.

Referring to FIGS. 3-5A, as part of a releasable retaining means, retaining clip 600 is positioned in piston rod groove 50*z*. Clip 600 may be in the form of, for example, a conventional snap ring structured to be resiliently deflectable or expandable responsive to insertion of the piston rod into a central opening defined by the clip. Clip 600 is structured to abut a feature positioned in the housing interior, to prevent or limit motion of both the piston rod and a striker coupled to the piston rod in a direction from the housing interior toward the housing exterior (i.e., in the direction of arrow V (FIG. 2)) prior to activation of the actuator and also in response to a force applied by the compressed sealing means to the piston rod/striker sub-assembly in direction V. In the embodiment shown, the clip 600 is structured to abut a surface 12*g*-1 of housing end wall 12*g* within the housing interior, to prevent motion of the piston rod 50 and striker 500 in direction V when the sealing means is compressed, prior to activation of the actuator.

During assembly of the actuator, a force is applied to the piston rod 50 in direction V so that the clip 600 abuts housing end wall 12g (or another suitable feature located within the housing). While the piston rod is maintained in this position, a force is exerted on striker 500 to force the striker in direction V2, farther into the hollow interior of the piston rod, simultaneously compressing the sealing means 650 between the striker bearing portion 500b and the bearing surface. The striker 500 is then secured or maintained in the position in which the sealing means 650 is compressed between the striker and the bearing surface. The sealing means then remains compressed, thereby forming a gas-tight seal to aid in preventing contaminants from entering housing 12 prior to actuator activation.

In a particular embodiment, the striker is secured to the piston rod by a threaded connection. With clip 600 abutting and anchored against housing end wall 12g, as the striker is screwed into the piston rod by rotating it with respect to the piston rod, striker bearing portion 500b is drawn toward the bearing surface (in FIGS. 1-5, mounting member 550), thereby compressing sealing means 650. When the sealing means 650 is in a compressed state, the sealing means exerts a reaction force tending to push the striker/piston rod sub-assembly in direction V, against the retention force provided by clip 600. The clip 600 and groove 50z are structured so that clip 600 remains seated within groove 50z during the initial compression of the sealing means and also during the entire period following actuator assembly, through actuator installation (for example, in a vehicle in a hood lifter application) and prior to actuator activation. The clip 600 and groove 50z are also structured so that forces produced by pressurized gases acting on piston 30 (resulting from activation of the actuator (by activation of gas generator 14, for example)) are sufficient to produce deformation of the clip 600 and/or ejection or release of clip 600 from groove 50z, thereby overcoming the clip retention force so that the clip no longer applies any resistance to motion of the piston rod in direction V, or so that any force applied by the clip provides so little resistance to motion of the piston rod that it does not impair the desired functioning of the actuator. This releases the piston rod and striker to move further in direction V. The detailed structure (including dimensions) of the clip and groove necessary to provide the desired retention characteristics for a given application may be determined analytically and/or iteratively, through experimentation using known procedures.

If desired, groove 50z may include a sloped surface or ramp 50y (as shown in FIGS. 4 and 5, for example) formed into or along a side of the groove closest to piston rod end 50a. This provides an inclined surface to facilitate removal of the retaining clip 600 from the groove 50z as the piston rod moves in direction V after the actuator is activated. The dimensions of the sloped surface may be adjusted to tailor the amount of force needed to force the retaining clip out of the groove 50z.

Referring to FIGS. 6A-6B, in another alternative embodiment 210 of the actuator, the bearing surface used for compressing the sealing means is provided by a reinforcing member 32 applied to the housing end 12b to reinforce or strengthen the housing end wall 12g against impact forces exerted by the piston 30 contacting the end wall at the end of the piston stroke (i.e., at full stroke).

In the embodiment shown in FIGS. 6A-6B, the reinforcing member 32 is in the form of a collar or cap attached to an end of housing 12 by welding or any other suitable method. However, the cap may have any alternative configuration suitable for the requirements of a particular application. In the embodiment shown in FIGS. 6A-6B, cap 32 has a base portion 32a and a wall 32b extending in a first direction from an edge of the base portion to define a cavity 32c structured for receiving therein a portion of housing second end 12b. Cap base portion 32a also has an opening 32d formed therein. Opening 32d is coaxial with (or is otherwise aligned with) opening 12f in housing 12 to enable piston rod 50 to extend through the opening. Opening 32d allows fluid communication with the interior of housing 12 when the cap 32 is attached to the housing end. In this embodiment, an exterior surface 32x of cap base portion 32a provides the bearing surface against which the sealing means 650 is compressed by forces applied by the striker 500 as previously described. Opening 32d may be sized to provide a clearance between the piston rod 50 and edges of the opening, or to otherwise permit the piston rod to slide along the edge of the opening during movement of the piston rod. Reinforcing member 32 may be formed from a metallic material or any other suitable material or materials.

Also, the embodiment shown in FIGS. 6A-6B includes a mounting member 550' and an associated attachment collar 560' (similar to mounting member 550 and collar 560 shown in FIGS. 1-5 and previously described) repositioned to a central portion of the housing exterior.

Referring to FIGS. 6A-6B, in one mode of application of the sealing means 650 to the actuator, when it is desired to install the sealing means 650 in the actuator, the sealing means 650 is applied to reinforcing member bearing surface 32x so as to surround or circumscribe the cap opening 32d. Alternatively, the sealing means 650 may be applied over striker base portion 500a so as to rest against striker bearing portion 500b. Striker base portion 500a is then inserted into piston rod second end 50b and forced toward piston rod first end 50a in a manner previously described until striker bearing portion 500b compresses the sealing means 650 against the cap bearing surface 32x, thereby forming a seal between the striker 500 and the reinforcing member 32. The striker is then left or secured in this compression position.

Figure 9:
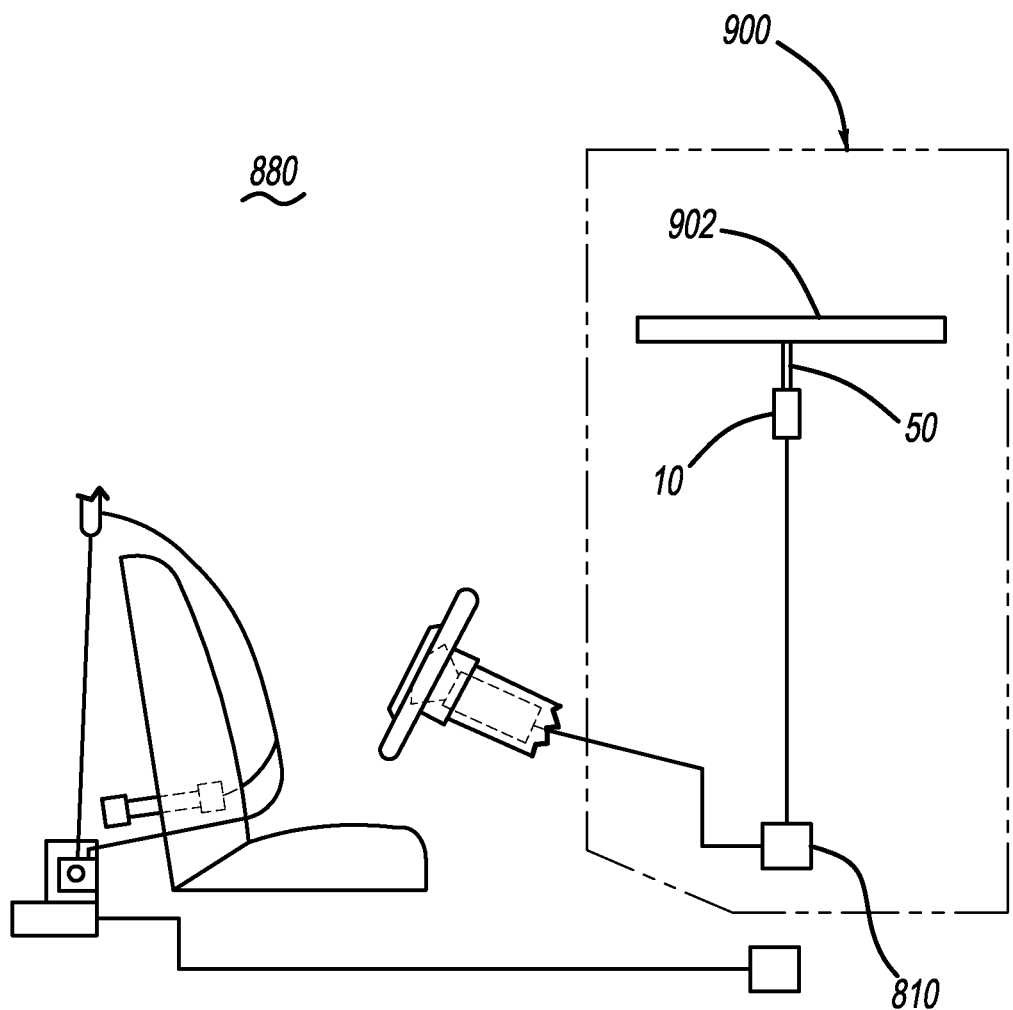
FIG. 9 is a schematic view of a portion of a pedestrian protection system installed in a vehicle and incorporating an actuator in accordance with an embodiment described herein employed as a hood-lifting device.

FIG. 9 is a schematic view of a portion of a pedestrian protection system 900 installed in a vehicle 880 and incorporating an actuator 10 in accordance with an embodiment described herein used as a hood-lifting device. In this embodiment of the pedestrian protection system 900, the protection system includes a vehicle mounted sensor apparatus 810 configured to detect or predict (using, for example, a radar or lidar sensor) contact between the vehicle and a pedestrian. The sensor apparatus detects or predicts contact between the vehicle and a pedestrian (not shown) and, responsive to this detected or predicted contact, an activation signal is sent to the hood-lifting mechanism 10, resulting in activation of the gas generator or otherwise releasing pressurized gases into the interior of housing 12 to produce extension of the piston rod 50 from the housing, as previously described. The extending piston rod 50 then raises the portion of the hood 902. The hood-lifter activation signal may be sent from the sensor 810 or from a suitably-configured controller (not shown) which receives the vehicle-pedestrian contact signal from sensor 810 and generates the activation signal in response thereto.

As utilized herein, the terms "approximately", "about", "substantially", and similar terms are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the invention as recited in the appended claims.

It is important to note that the construction and arrangement of the actuator as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosure herein. Accordingly, all such modifications are intended to be included within the scope of the present application. The order or sequence of any process or method steps may be varied or re-sequenced according to alternative embodiments. Other substitutions, modifications, changes and omissions may be made in the design, operating conditions and arrangement of the exemplary embodiments.

What is claimed is:

1. A pressurized fluid-powered actuator comprising:
   a housing having an interior and an exterior;
   a striker movably coupled to the housing;
   a resilient seal positioned between the striker and the housing, the seal being compressible so as to seal an end of the housing responsive to a force exerted on the seal by the striker in a first direction toward the housing; and
   a releasable retainer operatively coupled to the striker within the interior of the housing and structured to prevent motion of the striker, in a second direction opposite the first direction prior to activation of the actuator, responsive to a reaction force in the second direction exerted on the striker by the seal when the seal is compressed.

2. The actuator of claim 1 further comprising a piston rod movably positioned within the housing, wherein the striker is operatively coupled to the piston rod so as to move with the piston rod, and wherein the releasable retainer comprises a groove formed along the piston rod and a retaining clip positioned in the groove and structured to abut a portion of the housing so as to limit motion of the piston rod in the second direction prior to activation of the actuator.

3. The actuator of claim 2 wherein the groove includes a sloped surface structured to facilitate removal of the retaining clip from the groove as the piston rod moves in the second direction after the actuator is activated.

4. The actuator of claim 2 wherein the retaining clip comprises a snap ring structured to be resiliently deflectable or expandable responsive to insertion of the piston rod into a central opening defined by the clip.

5. The actuator of claim 1 wherein the seal comprises a ring overmolded with a resiliently deformable material structured to be compressible by a force exerted thereon in the first direction.

6. The actuator of claim 5 wherein the ring has first and second surfaces, wherein the resiliently deformable material extends from the first surface a first distance in the first direction, and wherein the resiliently deformable material extends from the second surface a second distance in the second direction opposite the first direction.

7. The actuator of claim 1 wherein the seal is structured to be compressed by the striker directly against the housing to form a seal between the striker and the housing.

8. The actuator of claim 1 further comprising a mounting member operatively coupled to the housing, and wherein the seal is structured to be compressed by the striker directly against the mounting member to form a seal between the striker and the mounting member.

9. The actuator of claim 1 further comprising a reinforcing member operatively coupled to the housing, and wherein the seal is structured to be compressed by the striker directly against the reinforcing member to form a seal between the striker and the reinforcing member.

10. A vehicle including an actuator in accordance with claim 1.

11. A pedestrian protection system including an actuator in accordance with claim 1.

12. An actuator comprising:
    an actuator housing including an exterior and an interior of the housing;
    a striker movably coupled to the housing, the striker including a bearing portion positioned exterior of the housing;
    a bearing surface supported by the actuator housing and positioned opposite the striker bearing portion, the bearing surface defining an opening permitting fluid communication between the exterior and the interior of the housing;
    a seal structured to abut the bearing surface so as to circumscribe the bearing surface opening, and structured to be compressible between the striker bearing portion and the bearing surface so as to form a seal between the striker and the bearing surface; and
    a releasable retainer operatively coupled to the striker within the interior of the housing, the retainer being configured to prevent motion of the striker in a direction away from the housing when the seal is compressed, prior to activation of the actuator.

13. The actuator of claim 12 wherein the bearing surface is formed by an exterior surface of the housing.

14. The actuator of claim 12 further comprising a mounting member operatively coupled to the housing, and wherein the bearing surface is formed on the mounting member.

15. The actuator of claim 12 further comprising a piston rod movably positioned within the housing, wherein the striker is operatively coupled to the piston rod so as to move with the piston rod, wherein the releasable retainer comprises a groove along an exterior surface of the piston rod, and a retaining clip positioned in the groove, and wherein the retaining clip is structured to contact a feature positioned in the housing interior when the seal is compressed against the bearing surface.

16. A vehicle including an actuator in accordance with claim 12.

17. A pedestrian protection system including an actuator in accordance with claim 12.

18. An actuator comprising:
    an actuator housing including an exterior and an interior;
    a piston rod movably positioned within the housing;
    a striker operatively coupled to the piston rod so as to move with the piston rod, the striker including a bearing portion positioned exterior of the housing;
    a bearing surface positioned opposite the striker bearing portion, the bearing surface defining an opening permitting fluid communication between the exterior and the interior of the housing;
    a seal structured to abut the bearing surface so as to circumscribe the bearing surface opening, and structured to be compressible between the striker bearing portion and the bearing surface so as to form a seal between the striker and the bearing surface; and a releasable retainer operatively coupled to the piston rod within the interior of the housing, the retainer being structured to prevent motion of the piston rod in a direction from the housing interior toward the housing exterior when the seal is compressed, prior to activation of the actuator.

19. A vehicle including an actuator in accordance with claim 18.

20. A pedestrian protection system including an actuator in accordance with claim 18.

* * * * *